(12) United States Patent
Granstrand

(10) Patent No.: US 12,030,176 B2
(45) Date of Patent: Jul. 9, 2024

(54) PARALLEL KINEMATIC MANIPULATOR SYSTEM AND CONTROL METHOD THEREFOR

(71) Applicant: XENIDEV AB, Stockholm (SE)

(72) Inventor: Oskar L. Granstrand, Stockholm (SE)

(73) Assignee: Xenidev AB, Stockholm (SE)

( * ) Notice: Subject to any disclaimer, the term of this patent is extended or adjusted under 35 U.S.C. 154(b) by 0 days.

(21) Appl. No.: 15/317,968

(22) PCT Filed: Jun. 10, 2015

(86) PCT No.: PCT/SE2015/050676
§ 371 (c)(1),
(2) Date: Dec. 11, 2016

(87) PCT Pub. No.: WO2015/190988
PCT Pub. Date: Dec. 17, 2015

(65) Prior Publication Data
US 2017/0190057 A1     Jul. 6, 2017

(51) Int. Cl.
*B25J 17/00*     (2006.01)
*B25J 9/00*     (2006.01)
*B25J 9/16*     (2006.01)

(52) U.S. Cl.
CPC ............. *B25J 17/00* (2013.01); *B25J 9/0033* (2013.01); *B25J 9/1623* (2013.01);
(Continued)

(58) Field of Classification Search
CPC . B25J 17/00; B25J 9/0033; B25J 9/003; B25J 9/0051; Y10S 901/28; G05B 2219/37094
(Continued)

(56) References Cited

U.S. PATENT DOCUMENTS 3,779,400 A     12/1973   Brockman et al.
6,330,837 B1 *  12/2001   Charles .................... B25J 11/00
                                                              74/490.06
(Continued)

FOREIGN PATENT DOCUMENTS

EP         1839804 A2     10/2007
WO         0222320 A1      3/2002
(Continued)

OTHER PUBLICATIONS

Zhang et al. "Optimal Kinematic Calibration of Parallel Manipulators With Pseudoerror Theory and Cooperative Coevolutionary Network". In: IEEE Transactions on Industrial Electronics, vol. 59, No. 8, Aug. 2012, p. 3221-3231.
(Continued)

*Primary Examiner* — Joshua T Kennedy

(57) ABSTRACT

A parallel kinematic manipulator system having three degrees of freedom and a method of controlling and visualizing work objects using force feedback and oscillation algorithms is provided. Three co-planar linear actuators operate symmetrically and parallel to an effector arm and are pivotally connected by three magnetic disc swivel joints to a base plate. The disc swivel joints each include a convex upper and lower swivel member having two dimensional gear patterns structured into their contacting and non-sliding surfaces. A pulsed illumination source consists of an annular LED array and is synchronized to the oscillation frequencies of the system to provide visual filtering capabilities. A control unit includes a method for keeping a work object balanced by force feedback and without the need for angle sensors at the end-effector, as well as methods for rotation of work objects and control of the pulsed illumination source. Sound trap ridges are included as part of the housing to reduce system noise.

20 Claims, 16 Drawing Sheets

(52) U.S. Cl.
CPC ............ *G05B 2219/37094* (2013.01); *G05B 2219/37325* (2013.01); *Y10S 901/28* (2013.01)

(58) Field of Classification Search
USPC ........................................ 74/490.1
See application file for complete search history.

(56) References Cited

U.S. PATENT DOCUMENTS

| | | | |
|---|---|---|---|
| 7,188,544 | B2 | 3/2007 | Persson et al. |
| 2008/0202273 | A1* | 8/2008 | Wood ................ B23Q 1/44 74/490.1 |
| 2010/0234844 | A1* | 9/2010 | Edelhauser ........... A61B 17/62 606/56 |
| 2012/0168593 | A1* | 7/2012 | Mekid ................ F16M 11/043 248/398 |
| 2014/0150593 | A1 | 6/2014 | Brown et al. |
| 2016/0288317 | A1* | 10/2016 | Gheorghe ............... B25J 9/003 |
| 2017/0221376 | A1* | 8/2017 | Gosselin ............... B25J 9/0072 |
| 2018/0071874 | A1* | 3/2018 | Bergeron ............... B23Q 1/54 |

FOREIGN PATENT DOCUMENTS

| | | |
|---|---|---|
| WO | 03078111 A1 | 9/2003 |
| WO | 2014040188 A1 | 3/2014 |

OTHER PUBLICATIONS

International Search Report for corresponding PCT Application No. PCT/SE2015/050676.

* cited by examiner

PARALLEL KINEMATIC MANIPULATOR SYSTEM AND CONTROL METHOD THEREFOR

CROSS-REFERENCE TO RELATED APPLICATIONS

This application is the national phase under 35 U.S.C § 371 of PCT International Application No. PCT/SE2015/050676 which has an International filing date of Jun. 10, 2015, which designates the United States of America and which claims priority from U.S. Provisional Application Ser. No. 62/010,469, filed Jun. 11, 2014, the entire contents which are incorporated by reference herein.

BACKGROUND OF THE INVENTION

The present invention relates to robotics. More particularly, the invention relates to a single arm parallel kinematic manipulator system with three degrees of freedom and a method of controlling the same. The use of robotic systems for inspection, testing, probing and manipulation of work objects is increasingly common, not only in industrial automation, but also in research and most recently in home automation. As current automation technologies continue to diffuse from the industrial field into other fields, it has become increasingly apparent that many solutions are simply not cost effective enough to be implemented in areas other than large-scale manufacturing. Thus, there is a need for more cost effective solutions. Further, the miniaturization of testing and screening procedures within for example life science requires fast and simple mechanisms of operation, in order to allow for high throughput screening and manipulation of work objects in for example lab-on-a-chip environments. In many manipulator systems, the number of sensors necessary for satisfactory operation involves added weight and lower speeds, higher costs, and less freedom to move around the work space. Also, under certain working conditions damp environments and electromagnetic disturbances may interfere with sensors if they are located too close to the end-effector. Thus, there is a need for a fast manipulator system with as few sensors as possible and an unobtrusive end-effector resistant to sensor interference.

In certain situations were good visual feedback of the automation process is sought for, a high-speed delta manipulator such as the one disclosed by U.S. Pat. No. 7,188,544B2 is able to operate at speeds where the human eye may have difficulties tracking the process, and movements may thus appear indistinct. This can be unsatisfactory to an operator. Therefore a need exists for a manipulator system that can provide good visual feedback of the automation process even when the operational speeds are high. Fast robotic manipulations, with frequencies reaching into the audible range, is furthermore a growing work environment problem when e.g. industrial robots are placed and used in otherwise mostly silent work environments with high human proximity.

Parallel kinematic manipulator systems according to the delta concept have been known for quite some time in the automation field, and one example is given in U.S. Pat. No. 7,188,544B2 as mentioned above. There also exist a number of technical approaches for achieving at least three degrees-of-freedom (3-DOF) of operation using closed-loop kinematic structures. Further, robotic arms operating under Cartesian coordinate systems, where its three principal axes of control are linear and orthogonal, are relatively straightforward to construct and simple to control. Disclosure of such a 3-DOF Cartesian manipulator solution requiring very little custom made components, and thus significantly cutting manufacturing costs, have for example been made in U.S. Pat. No. 3,779,400A. A number of disadvantages however exist with this linear and orthogonal solution, such as limited speed and precision due to damping in and deformation of the flexible couplings, as well as tensile wear and less reluctance to shear stresses at both the actuators and the flexible couplings.

BRIEF DESCRIPTION OF THE DRAWINGS

An exemplary embodiment of the present invention is illustrated in the accompanying drawings, in which.

DETAILED DESCRIPTION

Figure 1:
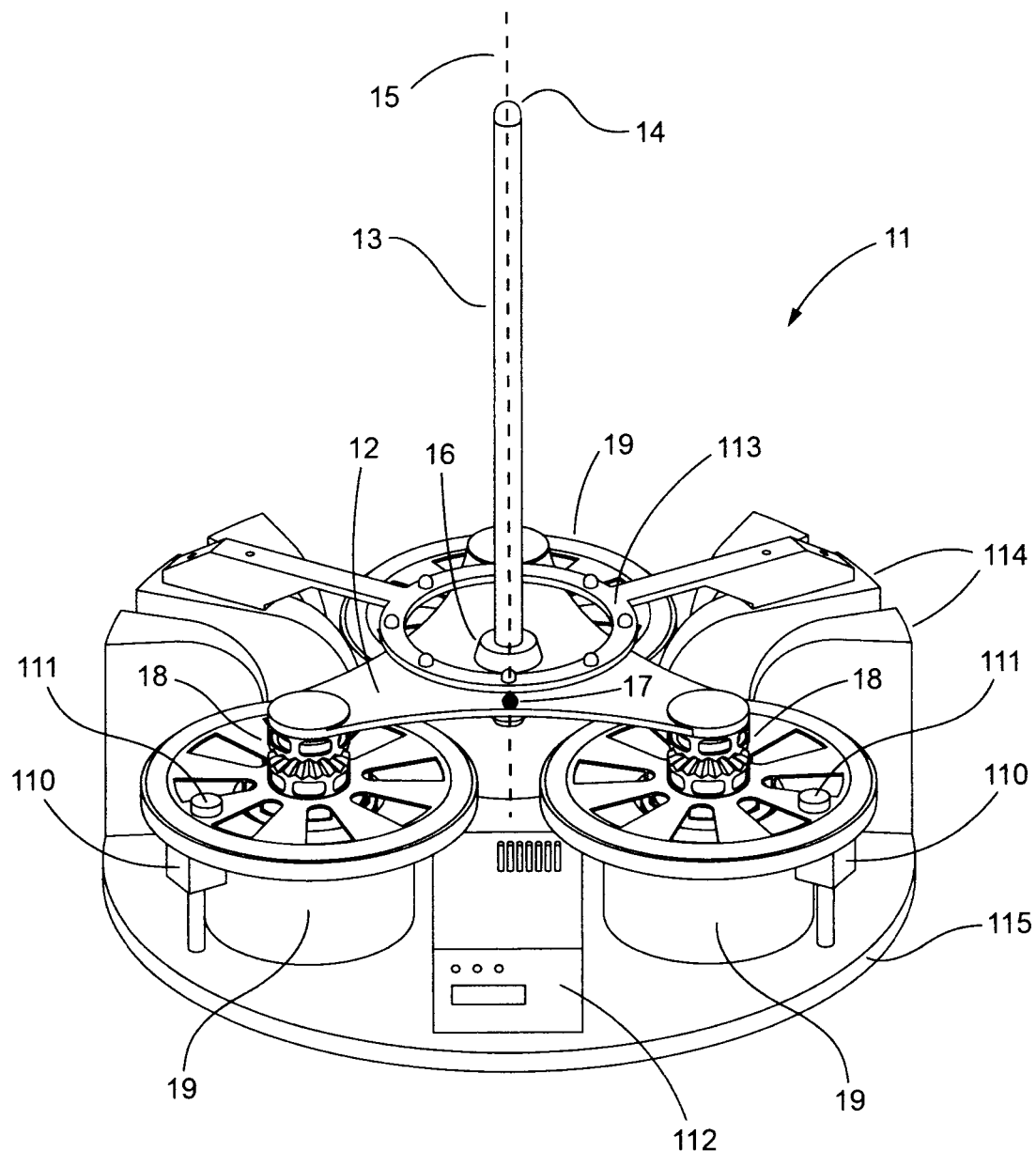
FIG. 1 illustrates a parallel kinematic manipulator system in perspective, according to an embodiment of the invention.
Figure 1:
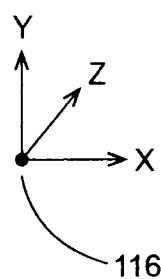

Hereinafter, embodiments of a parallel kinematic manipulator system and a control method therefor according to the present invention is described with reference to the accompanying drawings. Like reference numerals refer to like elements throughout.

Figure 2:
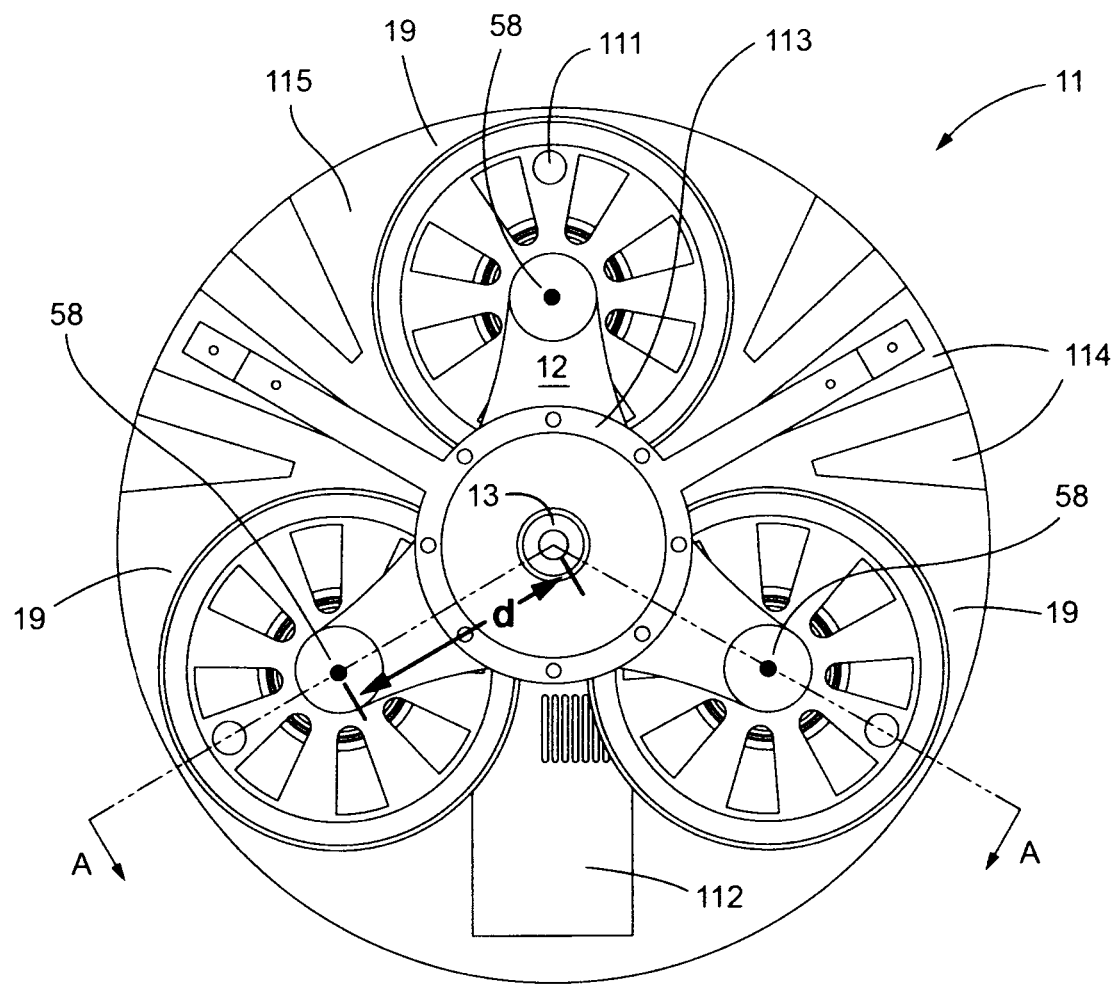
FIG. 2 illustrates a top plan view of the parallel kinematic manipulator system according to FIG. 1.
Figure 3:
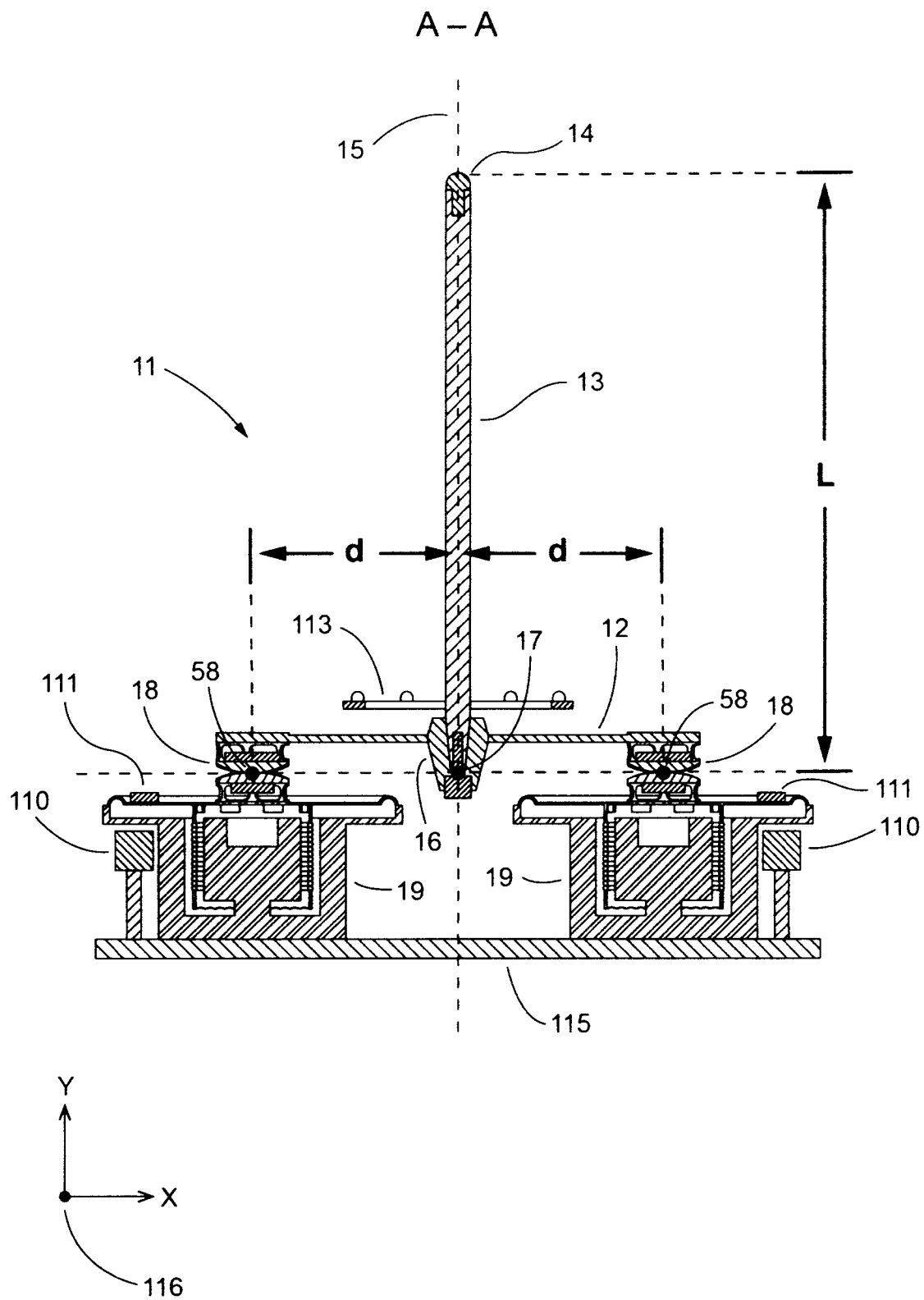
FIG. 3 illustrates a vertical cross section of the parallel kinematic manipulator system according to FIG. 2 and taken along line A-A.

Referring to FIGS. 1, 2 and 3, a parallel kinematic manipulator system 11 is disclosed according to an embodiment of the invention. Three linear coil (LC) actuators 19 are positioned in a plane parallel to ground plate 115, and having its principal axis of operation in parallel to an effector arm 13. An effector base plate 12 is in its resting position configured parallel to ground plate 115. Effector arm 13 is rigidly and at right angle connected by means of effector base plate connector 16 to effector base plate 12. At a distal end of effector arm 13 is an effector tip 14 that has a high coefficient of friction coating, such as a silicone polymer, to ensure good contact conditions with a work object. Whenever reference is made to only the effector, the term is unless otherwise mentioned understood to include all of the previous recited structures (base, arm, tip), and should as a whole be treated as a single rigid body. The term end-effector should be regarded as the effector tip 14 with or without also including a proximal portion of the effector arm 13. The three magnetic disc swivel joints 18 are on a large scale behaving as universal joints in transferring linear motion of the LC actuators 19 to both linear and angular motion of the effector base plate 12, and as such makes for a pivotal connection between base plate 12 and ground plate 115. Referring to FIG. 2 and as seen herein the magnetic disc swivel joints 18 are placed symmetrically in the X-Z plane around the centrally located effector arm 13, according to an embodiment of the invention. This configuration effectively qualifies for an effector virtual joint 17 located along effector axis 15, later on to be defined.

In proximity to each of the LC actuators 19 respectively are three Hall effect (HE) sensors 110, each responding to movement of the three actuators through three HE magnetic members 111, respectively fastened to an actuated portion of each of the actuators.

A digital control unit 112 receives sensory signals from the HE sensors 110 respectively, further makes processing of these and subsequently outputs appropriate control signals to the LC actuators 19 respectively in order to provide the necessary actuation of the effector arm 13.

Pulsed illumination source 113 is preferably a high bandwidth full spectrum power LED array and has a symmetric annular configuration with respect to the effector axis 15, allowing for a high switching frequency to be used for consistent motion filtering of the effector arm and work object, a mechanism which later on will be further defined.

Figure 17:
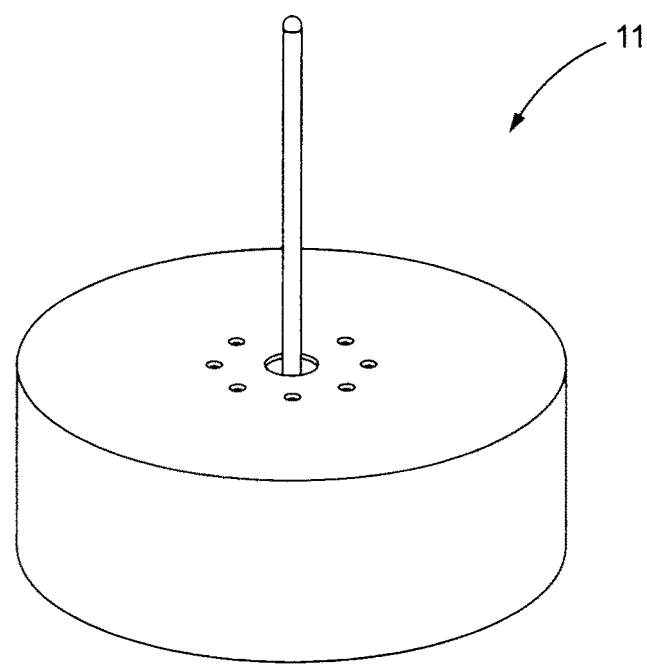
FIG. 17 illustrates in perspective a parallel kinematic manipulator system including a housing, according to an embodiment of the invention.

Sound trap ridges 114 ultimately constitutes part of a housing, the housing being designed such that it encloses all moving parts except for the distal end of the effector arm 13 including effector tip 14 that engages contact with a work object, as illustrated by FIG. 17. Hence the housing, except for providing environmental protection, together with the sound trap ridges also help minimize system noise unavoidably produced by the moving parts.

Incorporating sound ridges into the housing also provides damping and reduced space for standing waves to occur at the operational frequencies of the LC actuators, which reduces the risk of unwanted structural and audible resonance.

Figure 4:
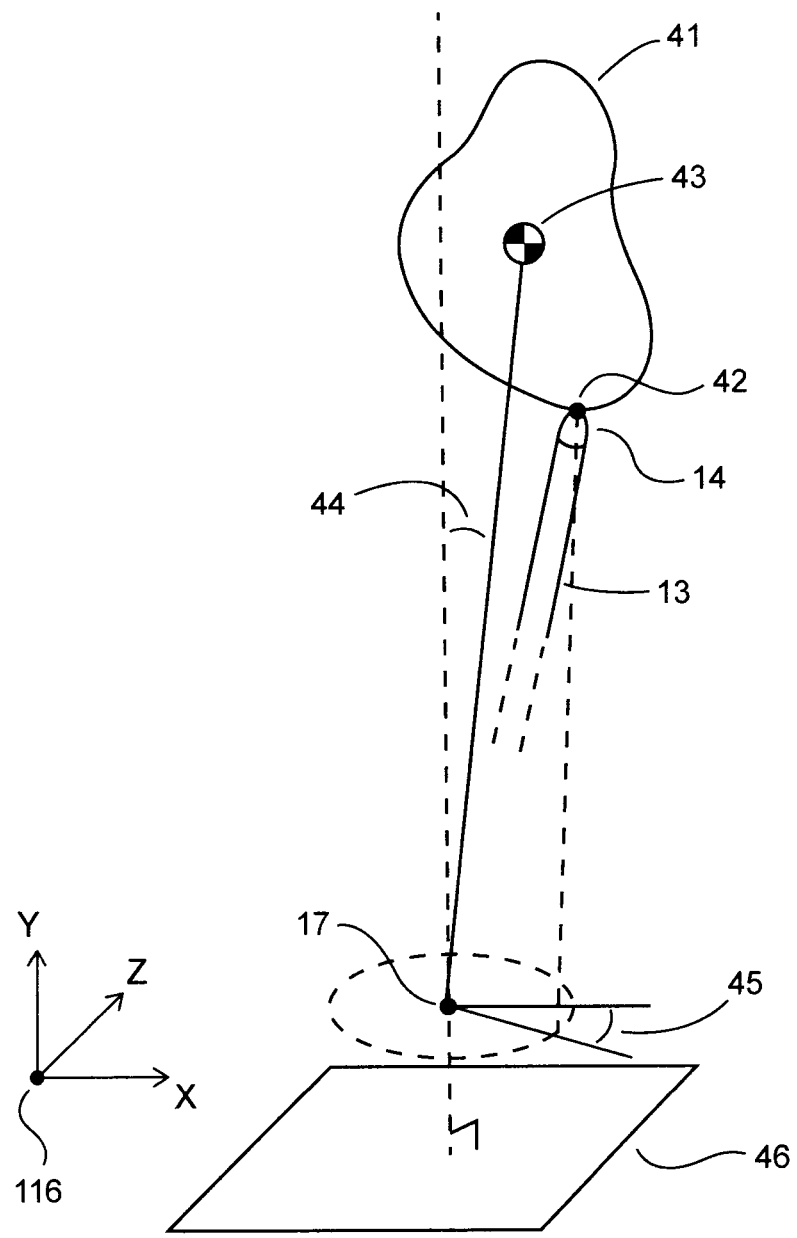
FIG. 4 diagrammatically illustrates an effector arm and work object along with relevant angle references, according to an embodiment of the invention.

Reference is next made to FIG. 4, a diagrammatic illustration in which a work object 41 is supported at a work object single contact point 42 by effector tip 14, at all times constituting the only physical link between the work object 41 and the parallel kinematic manipulator system 11. Work object 41 has an angular orientation defined by a work object general polar (wogP) angle 44 and a work object general azimuthal (wogA) angle 45. The wogP and wogA angles are exclusively reflective of plane motion parallel to ground plane 46 (i.e. motion in the X-Z plane), in turn intersected at right angle by effector axis 15.

Figure 5:
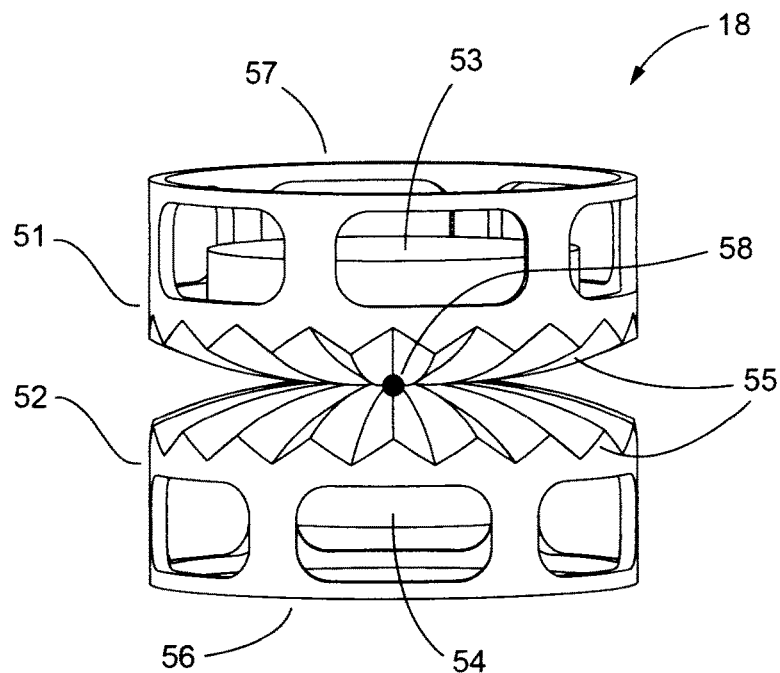
FIG. 5 illustrates in perspective a magnetic disc swivel joint with a triangular flare type gear pattern, according to an embodiment of the invention.

In one embodiment, and referring to FIG. 5, a magnetic disc swivel joint 18 comprises an annular shaped convex upper swivel member 51 and an annular shaped convex lower swivel member 52 positioned opposite and tangent to each other, allowing for a rolling, or swivel motion of the upper swivel member relative the lower swivel member. A joint upper magnet 53 positioned on the upper side of the upper swivel member exerts attractive forces on a joint lower magnet 54 positioned on the under side of the lower swivel member, thereby providing a constant or largely constant adhesion of the two swivel members against each other during the swivel motion. Further, in improving the adhesion and force transmission capabilities of the two swivel members beyond magnetic and pure frictional forces, as provided by for example a silicone polymer coating, a triangular flare gear pattern 55 is effectively used for imposing of a gear like sliding constraint on the swivel joint. In essence this creates a two dimensional gear transmission link with a very high resistance to internal slipping. A triangular flare gear pattern is useful for absorbing forces whose line of action is distal to the effector axis, for example the tangential acceleration and deceleration forces necessary for circular motion feedback control. Actuator connection means 56 connects the lower swivel member to the LC actuator, for example by sonic o laser welding, having symmetric continuous weld lines around the LC actuator line of action for reduced risk of stress cracking. Effector base plate connection means 57 is in a similar fashion connected to the effector base plate.

Figure 6A:
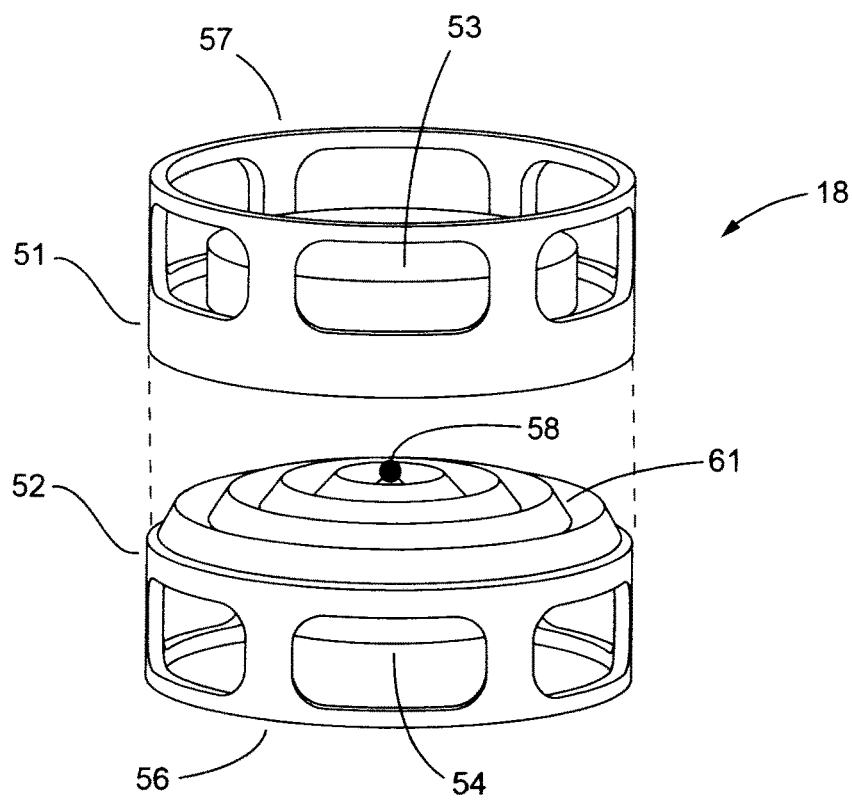
FIG. 6A illustrates in perspective a magnetic disc swivel joint with a triangular concentric type gear pattern, according to an embodiment of the invention.
Figure 6B:
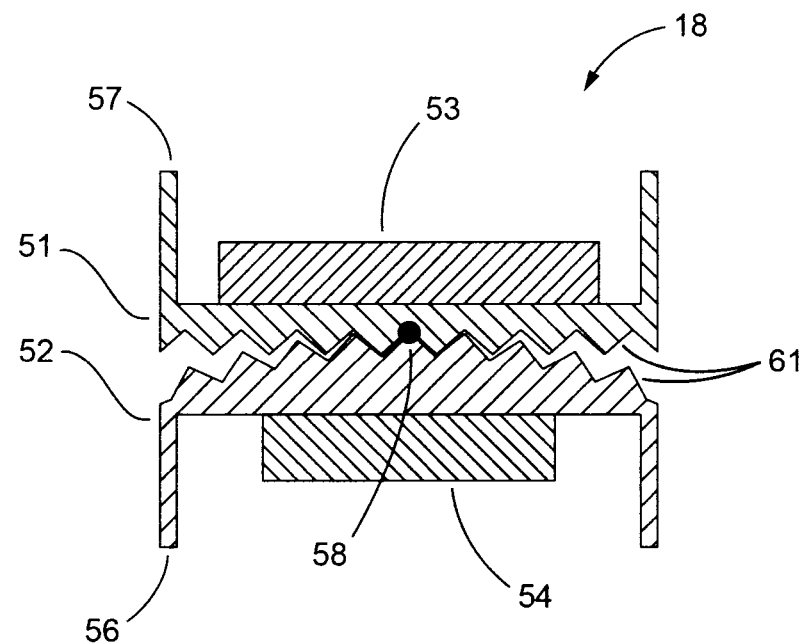
FIG. 6B is a vertical cross section of a magnetic disc swivel joint according to FIG. 6A.

In another embodiment, now referring to FIGS. 6A and 6B, the magnetic disc swivel joint according to FIG. 5 has a triangular concentric gear pattern 61 convexly structured into its lower swivel member 52, and the same triangular concentric gear pattern 61 being flatly structured into its upper swivel member 51. A triangular concentric gear pattern such as this is suitable for absorbing forces whose line of action is intersecting or proximal to the effector axis, for example the centripetal acceleration component of circular motion.

Figure 7:
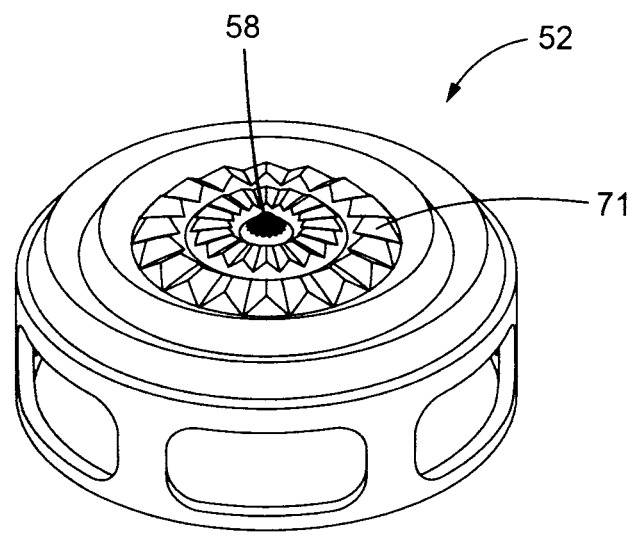
FIG. 7 illustrates in perspective a magnetic disc swivel joint lower member with superimposed triangular flare and concentric type gear patterns (hybrid gear pattern), according to an embodiment of the invention.

In another embodiment, now referring to FIG. 7, the magnetic disc swivel joint according to FIG. 5 has a hybrid gear pattern 71 consisting of superimposed triangular flare and concentric type gear patterns, structured into its upper 51 and lower 52 swivel members. A hybrid gear pattern takes advantage of both a flare and concentric type gear pattern characteristics. It can be tailored to varying degrees of mix between the flare and concentric structures, thus allowing for application specific optimization of the magnetic disc swivel joints.

Again referring to FIGS. 1, 2 and 3 the system 11 being a parallel kinematic manipulator warrants the forward kinematics transformation calculations necessary for translation of sensor linear positions to rotation and translation of the effector to be relatively straightforward. In taking advantage of the symmetric placement of the actuators of system 11, according to an embodiment of the invention, the calculations are even further simplified. For small deviations from equilibrium (that is, the resting state without any actuation) a closed form solution is readily constructed given the placement radius d of the joint equilibrium swivel points 58 and the effector arm length L, as shown by kinematic transformation equation 1:

$$P_s = \left[ \frac{L((s_2+s_3)/2-s_1)}{2dN_1}; \frac{s_1+s_2+s_3}{N_2}; \frac{L(s_3-s_2)}{2dN_3} \right] \quad \text{(Eqn. 1)}$$

where $s_1$, $s_2$ and $s_3$ are the three HE sensor readings respectively, $N_1$, $N_2$ and $N_3$ are normalization constants, which are set to $N_1=\frac{3}{4}$, $N_2=3$ and $N_3=\sin(2\pi/3)$ for 1:1 mapping characteristics in all dimensions, and output vector $P_s=[X_s; Y_s; Z_s]$ is the fused sensor estimate of the effector tip position. For actuation, as will be apparent upon further reading, a similar control signal transformation is also necessary after the feedback control stage to give the actuators a proper power input distribution. Given eight input signals $F_r$ (radial control output signal), $F_t$ (tangential control output signal), Cartesian actuation vector $P_c=[X_c; Y_c; Z_c]$, and fused sensor position vector $P_s=[X_s; Y_s; Z_s]$, equation 2 transforms these to the actuation output vector $P_a=[X_a; Y_a; Z_a]$, as shown:

$$x = X_c + \frac{F_r X_s}{|P_s|} - \frac{F_t Z_s}{|P_s|} \quad \text{(Eqn. 2)}$$
$$y = Y_c$$
$$z = Z_c + \frac{F_r Z_s}{|P_s|} + \frac{F_t X_s}{|P_s|}$$
$$P_a = \left[ -x + \frac{y}{3}; \frac{x}{2} - z\sin\frac{2\pi}{3} + \frac{y}{3}; \frac{x}{2} + z\sin\frac{2\pi}{3} + \frac{y}{3} \right]$$

For very small values of $|P_s|$ a floor saturation vector of for example $P_s=[\sqrt{\epsilon}; 0; 0]$ may be set. In observing the above equation, moment calculations on the virtual joint are always made in a manner that cancels out movement along the actuators' common line of action. By allowing actuation control only according to the above equations the effector virtual joint 17 in practice becomes dynamically constrained along the Y-axis (effector axis) with two further degrees of freedom being that of rotation around the X and Z axes. The configuration space is in effect thus changed from three linear DOF (joint space) to two angular and one linear DOF (virtual joint space). From virtual joint space coordinates, given the effector arm length, calculating the effector tip (end-effector) position and coordinates of the single contact point (operation space) is trivial and implicitly done by equation 1.

Figure 8:
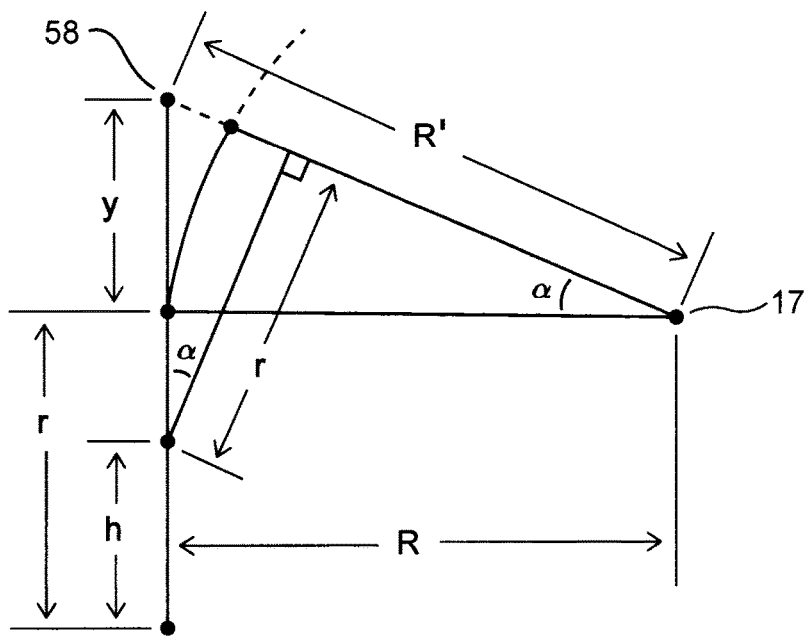
FIG. 8 is a diagram explaining the principle of operation of a cross sectioned magnetic disc swivel joint, according to an embodiment of the invention.

For larger deviations from equilibrium, and when utilizing a disc swivel joint assembly as disclosed by the previous embodiments, corrective calculations may further be necessary in order to achieve a sufficiently high accuracy in the forward kinematics transformations. This is due to the nature of the disclosed disc swivel joints comprising at least one convex swivel member, which will impose a non-linear relationship between the sensed linear vertical motion of the lower swivel member and the corresponding actual linear vertical motion of the joint equilibrium swivel point. This non-linear relationship is probably best understood by looking at FIG. 8, a diagrammatic illustration of the operation of a cross sectioned magnetic disc swivel joint having a flat upper swivel member, in which r is the lower swivel member radius of curvature, R is the distance to the effector virtual joint 17, $R'=\sqrt{(y^2+R^2)}$, h is the HE sensor distance reading, $\alpha$ is the effector base inclination angle and y represents the actual linear vertical motion of the joint equilibrium swivel point 58, which when used as corrective means in HE sensor reading can improve accuracy of the fused sensor estimate of the effector tip position. The relationship is algebraically according to FIG. 8 $r/(r-h+y)=R/\sqrt{(y^2+R^2)}$ or $y=(R^2h-R^2r+Rr\sqrt{(R^2+h^2-2rh)})/(R^2-r^2)$. It is understood that incorporating corrections for non-linearities in HE sensor readings $s_1$, $s_2$ and $s_3$ in equation 1 increases both precision and feedback control stability margins.

Figure 9:
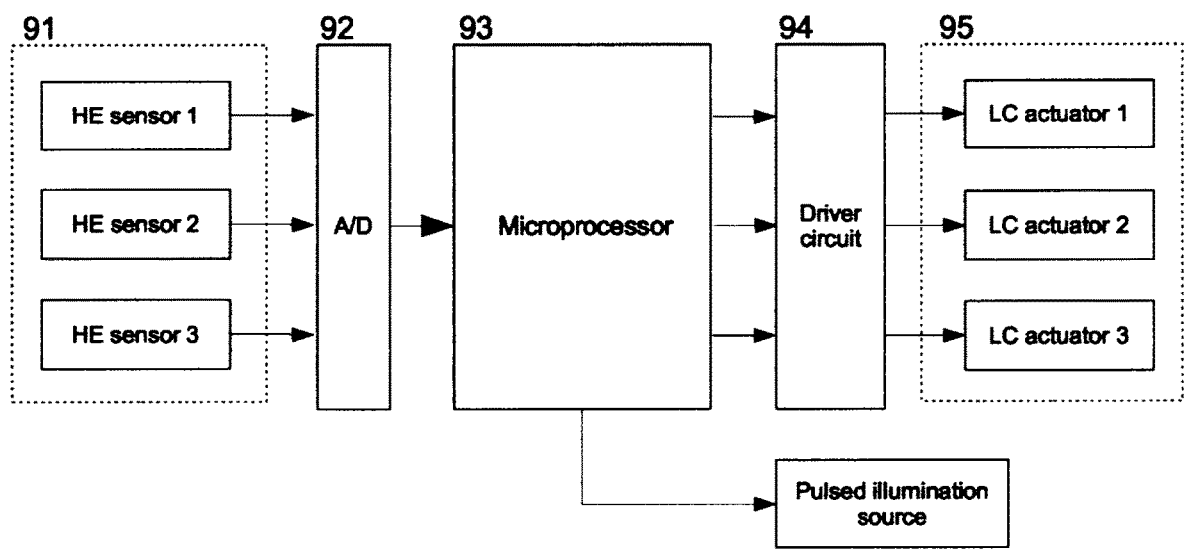
FIG. 9 is a block diagram representation of a control system, according to an embodiment of the invention.

Next, an overall configuration of a control system for a parallel kinematic manipulator system 11 according to FIG. 1 will be described. With reference to FIG. 9, the control unit 112 (FIG. 1) comprises a microprocessor 93, an A/D converter 92 and a driver circuit 94. Microprocessor 93 performs digital signal processing (DSP) and feedback control of the effector state, including position, velocity and acceleration of the effector tip, and hence also controls the work object single contact point state. A/D converter 92 digitizes the HE sensors' (91) analogue output readings, with a sample rate preferably at least four times that of the highest operational frequencies of the system. Driver circuit 94 in its essence constitutes six, operating in pairs, bridged power field effect transistors, each transistor pair being shunted to ground by two large farad (1 mF) capacitors for an averaged power and voltage actuation signal with reduced pulse width modulation (PWM) noise. A simple circuit principle of this is schematically illustrated by FIG. 15. In place of a D/A continuous output converter, PWM is according to one embodiment chosen for its higher power transmission capabilities. The PWM pulse frequency should be set generally as high as possible for sufficient feedback control stability margins and an acceptable audible noise profile of the LC actuators 95. In one embodiment a 30 kHz pulse frequency is used. In one embodiment the LC actuators 95 are helical electrical wire wound coils residing in a static magnetic field and thus have the capability to actuate linearly when current is flowing. In another embodiment the LC actuators 95 are speaker drivers, where instead of responding to audible AC signals they similarly respond to both DC and AC actuation signals. The speaker diaphragm is connected to the magnetic joint lower swivel member and moving linearly in response to the drive circuit actuation signal. Pulsed illumination source 113 is controlled by a single digital signal for on-off switching in a fashion according to FIG. 14, the switching method being further explained below.

Inside microprocessor 93 resides an instruction set or program memory capable of holding an operating system, general DSP algorithms for performing aforementioned kinematic transformations and corrections, digitally implemented feedback controller for actuation of the LC actuators and control of the pulsed illumination source, as well as state machine instructions for carrying out a control routine. The implemented feedback control structures can for example be that of proportional-integral-derivative (PID) or lead-lag kind. Furthermore, model predictive control (MPC) structures can be utilized for increased performance. The controller sample rate should be set preferably at least four times that of the highest operational frequencies of the system. According to one embodiment, PID control is combined with forward control for coping with certain time-critical transitions, which will become apparent upon further reading.

Figure 10A:
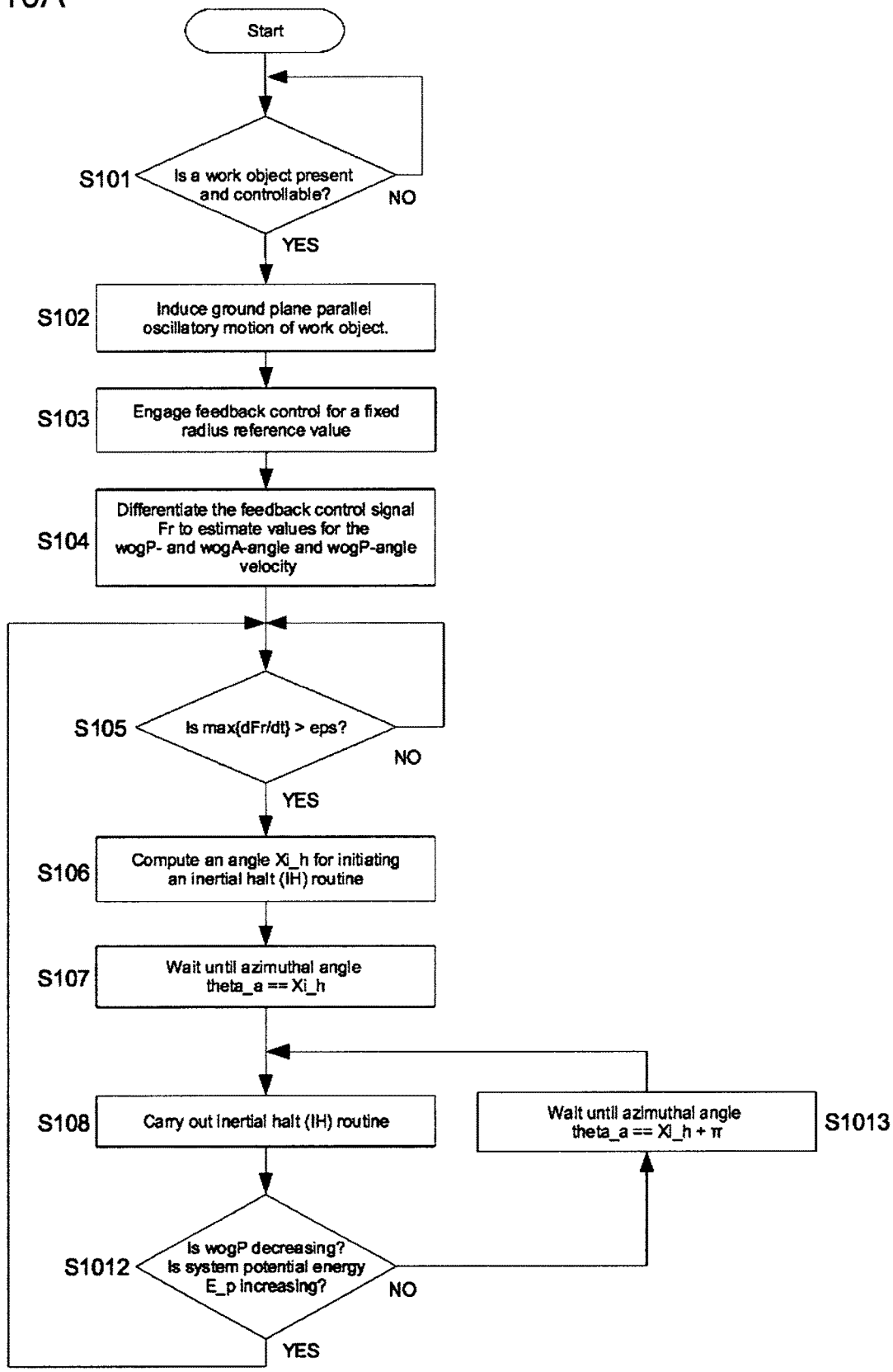
FIGS. 10A and 10B are flowcharts detailing the load balancing control (LBC) routine and inertial halt (IH) subroutine, according to an embodiment of the invention.
Figure 10B:
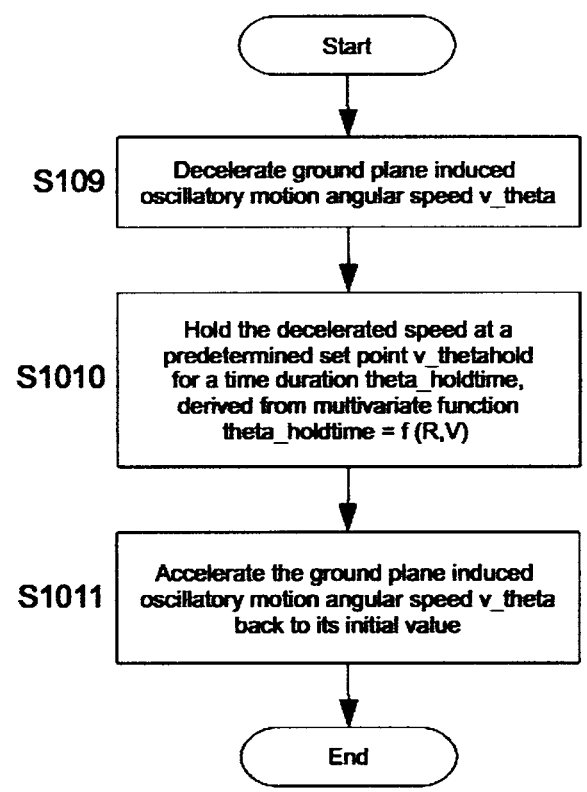

In one embodiment, and now with reference to FIGS. 10A and 10B, a particular control routine for the load balancing of a work object under gravity forces, implemented in microprocessor 93 (FIG. 9), is disclosed. According to this embodiment, the controller structure is one where the path coordinates (r-t-coordinates) of the single contact point are used as reference values. In successful experimental test runs, one "Fr" sub-controller has been configured as a PD-controller for control of the path radius, another "Ft" sub-controller as a PI-controller (with an upper saturation limit to constrain heavy start-up accelerations) to control the tangential speed (angular theta speed). Also, for Y-control a PD-controller has successfully been used. It is understood by anyone skilled in the art that low-pass prefiltering of the sensor signals may at all times be necessary. The angular theta speed, v_theta, is calculated accordingly as $v\_theta = \sqrt{[(\dot{X}_s^2 + \dot{Z}_s^2)/(X_s^2 + Z_s^2)]}$, preferably with a similar floor saturation vector for $P_s$ as stated earlier. A static reference value Ft_r for the Ft-controller is used to withhold a constant predefined angular speed. A dynamic reference value Fr_r(t) for the Fr-controller is generated by a "transition driver" and is used to induce and alter oscillatory motion, as will be explained.

The load balancing control (LBC) routine as of FIG. 10A effectively operates to counteract the falling of a work object off the effector arm due to gravity's pull, thereby greatly prolonging the possible manipulation time of the work object without the need for third body intervention or other stabilizing means, such as providing angle sensors at the effector tip. The disclosed LBC routine is designed for force control sensing of the reaction forces acting on the LC actuators, thus eliminating the need for parallel kinematic manipulator system 11 (FIG. 1) to specifically incorporate angle sensors for the wogP- and wogA-angles at, or in close proximity to the work object itself.

Now, referring to FIG. 10A, the LBC routine starts by detecting the presence and controllability of a work object (step 101). Presence is in its simplest manner checked by noting if there is any negative displacement of the LC actuators, indicating interaction of the effector and a load (work object). Controllability is in its simplest manner checked by assuring the work object is not to light in weight for adequate sensing abilities, nor too heavy in weight for operating on. Step 102 aims to engage the work object in an, by the LC actuators' induced, oscillatory motion, yet keeping the translatory motion of the work object center of gravity (CG) point as little as possible. This is in part accomplished by driving the Fr-controller reference value dynamically from r=0 to r=r_stat using a predefined transition function Fr_r(t). It is also in part accomplished by operating on a work object having a relatively steep mass density function that concentrates mass to, or around the CG-point (rather than the object boundaries). This greatly increases the oscillation possibilities of the single contact point with little motion impact on the CG-point, which is wished for. For many embodiments, equation 3 has been found to be a particularly suitable transition function:

$$Fr\_r(t) = \frac{1}{1 + e^{-bt+a}} \quad \text{(Eqn. 3)}$$

Figure 11A:
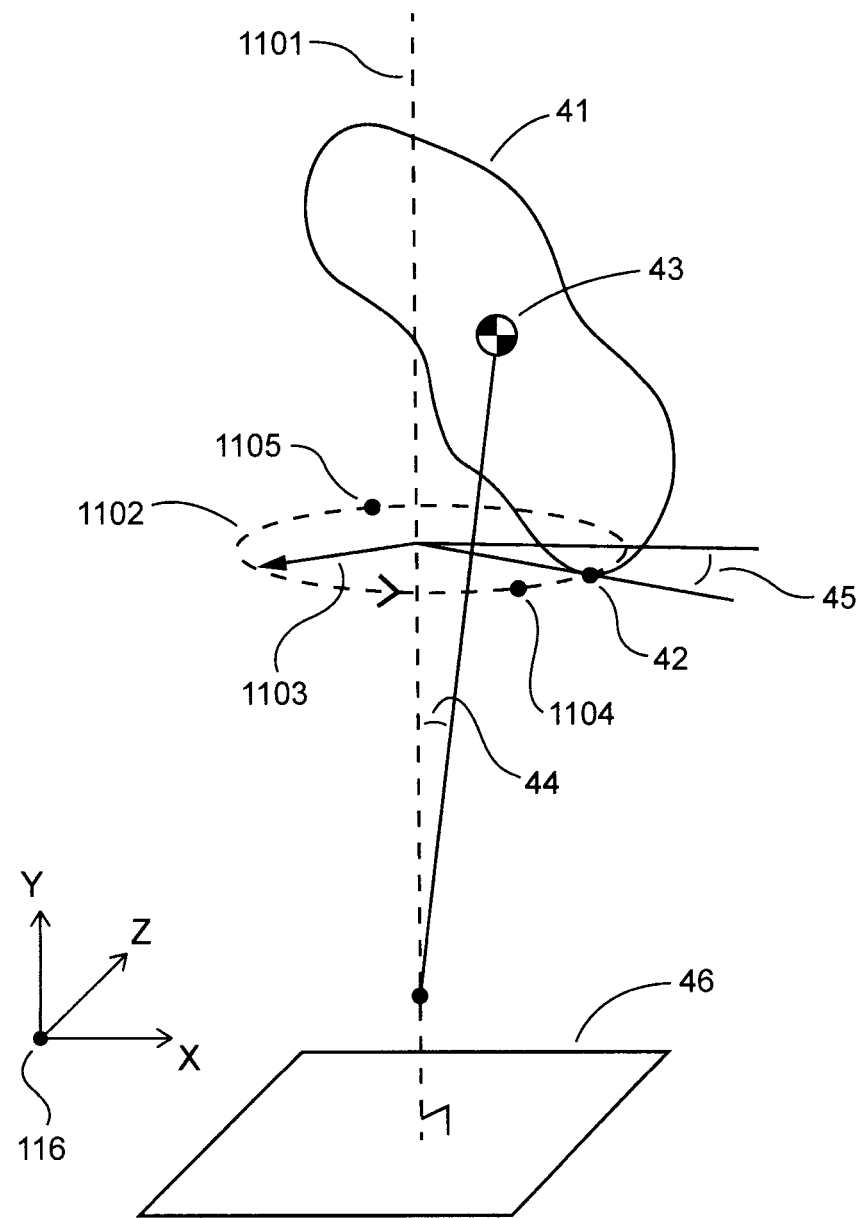
FIG. 11A diagrammatically illustrates an effector and work object being subjected to a circular induced oscillation, according to an embodiment of the invention.

Here constants a and b affect time response and interval limit values, and are thus set appropriately for necessary smoothness and response times. When the predefined radius of r=r_stat has been reached step 103 is entered, where constant feedback control of circular oscillatory motion of the single contact point is effected. Referring to FIG. 11A this motion corresponds to the circular induced oscillation path 1102. If this step is carried out indefinitely, the work object will in most cases quickly fall of the effector due to imbalance and controller excited vibration modes. In entering step 104 the Fr radial control output signal is differentiated once to measure deviations from an ideal circular path, or constant control (CC) radius 1103 (FIG. 11A), of the single contact point. When the work object CG-point motion starts to show drifting in a certain direction, i.e. the work object starts tilting (as indicated by the wogP-angle) in a certain direction (as indicated by the wogA-angle, also referred to as the wogA angle of tilt), this is reflected in the reading of the dFr/dt signal which will then oscillate with a phase that is proportional to the wogA-angle. The phase-reading can be extracted by for example noting the positional locations where the zero-crossings of the dFr/dt signal lie. Thus, it is understood that in combination with the $P_s$ positional data this allows an angle estimate c_angle of the wogA-angle to be made. The magnitude mag_dFr of the dFr/dt signal is in turn reflective of the magnitude of the wogP-angle. A velocity magnitude estimate mag_v_est can in its most basic manner be retrieved by differencing the mag_dFr timeseries. Likewise, a second differencing can retrieve acceleration estimates. Thus, by processing of the dFr/dt signal it is possible to estimate the state of the work object solely by force control sensing. Step 105 checks whether the dFr/dt signal is larger than a preset (small) threshold under which the signal processing is not sufficiently reliable, and, if it is not the check is performed again until it is. In step 106, an angular position angle Xi_h for initiation of an inertial halt (IH) routine is computed from the mag_v_est and c_angle estimates. This can be accomplished by a single weighting function such as (a*mag_v_est+b)*c_angle+c, where a, b and c are constants. It is understood that the computation may well be done with only a univariate function of c_angle, however adjusting also for the mag_v_est value greatly improves performance and stability. Furthermore, it is understood that accounting for the mag_dFr timeseries acceleration data may improve on the calculations even further. In step 107 the azimuthal angle of the effector arm theta_a (as observed in the X-Z plane) is tested against the Xi_h angle until they match and the step is exited.

Figure 11B:
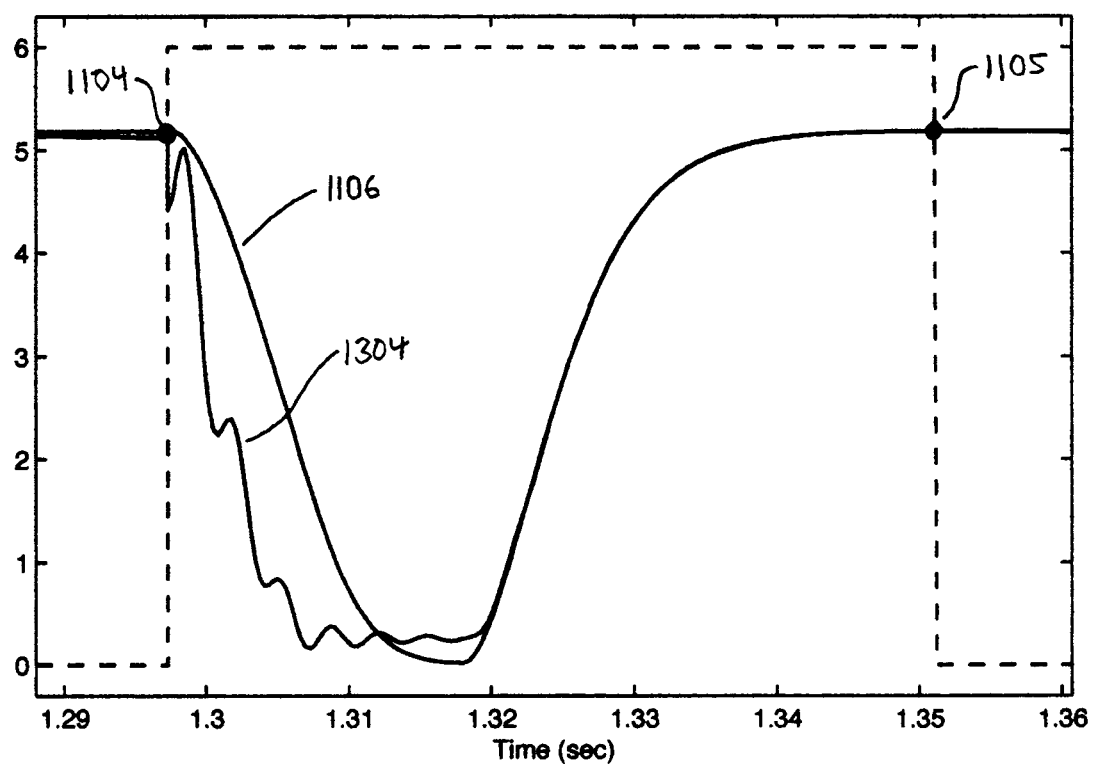
FIG. 11B is a graph showing a typical behavior of the single contact point angular speed during the deceleration, hold and acceleration forward control phases according to FIG. 11A.

Now referring to the next step 108, the IH-routine as shown in FIG. 10B in principle operates by bringing the induced oscillatory motion angular speed v_theta to a halt at an angular position whose direction vector is substantially lined up with the work object CG-point drift direction vector, thereby counteracting further drifting in this direction. As the IH-routine inevitably must include deceleration and acceleration transitions (steps 109 and 1011 respectively, FIG. 10B) the routine will once activated operate between two angular start 1104 and stop 1105 points, as shown in FIG. 11A and the corresponding time marks in FIG. 11B, where the signals displayed are the angular speed v_theta 1106 and the Fr radial control output 1304. In effecting the necessary decelerations and accelerations the Ft-controller is suggested to be wholly switched off and replaced by a separate PD-controller for the decelerations (accordingly with a negative reference value) and a PI-controller (accordingly with a positive reference value) for the accelerations. The Fr-controller should in theory be able to be left without intervention (at least, other than parametric) during the IH-routine, however the heavy tangential accelerations and decelerations produce likewise heavy centripetal forces that demand a very fast and stable Fr-controller, demands that has proven to hard to meet with the current disclosed PD-structure. However it has proven a successful strategy to, during the IH-routine, instead switch the Fr PD feedback controller to a model based forward controller FrM. An example of (simplified) model based control is to on beforehand estimate a virtual mass my from the centripetal force equation $F\_c=m*Q^2$, in this case $m\_v=Fr\_c/v\_theta^2$ (where $Fr\_c=Fr$ controller signal), and then back-substitute the m_v value for forward control according to $Fr\_c=m\_v*v\_theta^2$ during the IH-routine. This ensures a very fast and stable control during the short interval that the IH-routine is active.

Referring to FIG. 10B, when entering step 1010 it is assumed a predetermined set point angular speed value v_thetahold for the induced oscillatory motion has been reached. The set point angular speed is naturally the negative reference value used for the deceleration PD-controller (or close to due to the lack of integrator). In one embodiment this value is zero. The set point value is subsequently held for a time duration theta_holdtime calculated from a multivariate function theta_holdtime=f(R,V), where R=g (mag_dFr) and V=h(mag_v_est). The hold time is thus dictated by the magnitude of the differentiated Fr controller signal and also the magnitude of the estimated "velocities" of this signal. The sub-functions g and h may constitute each a simple linear weighting function of type a*u+b, where u is the signal and a and b are constants.

Referring again to FIG. 10A, in entering step 1012 drifting of the work object CG-point away from the vertical gyroscopic line 1101 (FIG. 11A) implies a decrease in the system total potential energy E_p. The vertical gyroscopic line is defined as the axis of revolution where the work object CG-point has its highest potential energy (and thus lines up with the effector axis and effector arm at the resting or equilibrium state). Given an altered state where the work object has a non-zero polar angle and thus less than maximum E_p the IH-routine can either have the effect of increase or decrease E_p. In the case that E_p is decreasing (mag_dFr is increasing) after step 108 the assumption should be that the angle Xi_h, and thus the drift vector of the CG-point, has the wrong direction. It is inevitably so that without further sensing means the estimation of the wogA-angle in step 104 can only tell the direction in a [0, π] interval. Therefore the calculated Xi_h angle is only a first guess, but the correct guess may in some configurations and scenarios in fact be Xi_h+π. When this is the case, step 1013 is entered and step 108 is carried out once more, except now with a π angle phase shift. If E_p is increasing (mag_dFr is decreasing) the process beginning from step 105 is re-iterated once again, thereby creating a loop allowing for infinite control.

It is understood that any locally induced oscillations of the CG-point (and hence also the E_p) existing as a direct result of the single contact point induced oscillatory motion are not to be construed as part of any general drifting of the CG-point and likewise they are not to be construed as part of the intrinsic change of the wogP-angle and E_p due to gravity forces. To be able to observe the general drifting a sufficiently large time window is necessary, such as a window stretching over several periods of revolutions of the induced oscillatory motion. It is furthermore understood that, in the embodiments described above the work object's reaction forces acting along the direction of the effector axis (or Y-axis according to FIG. 1) are in essence due to the gravity force acting on the CG-point, given movement of the work object in the Y-direction is constrained and the mass of the work object is sufficiently large. Therefore, maximizing the reaction forces when operating in a gravity field as described above implicitly also means maximizing E_p.

Figure 12:
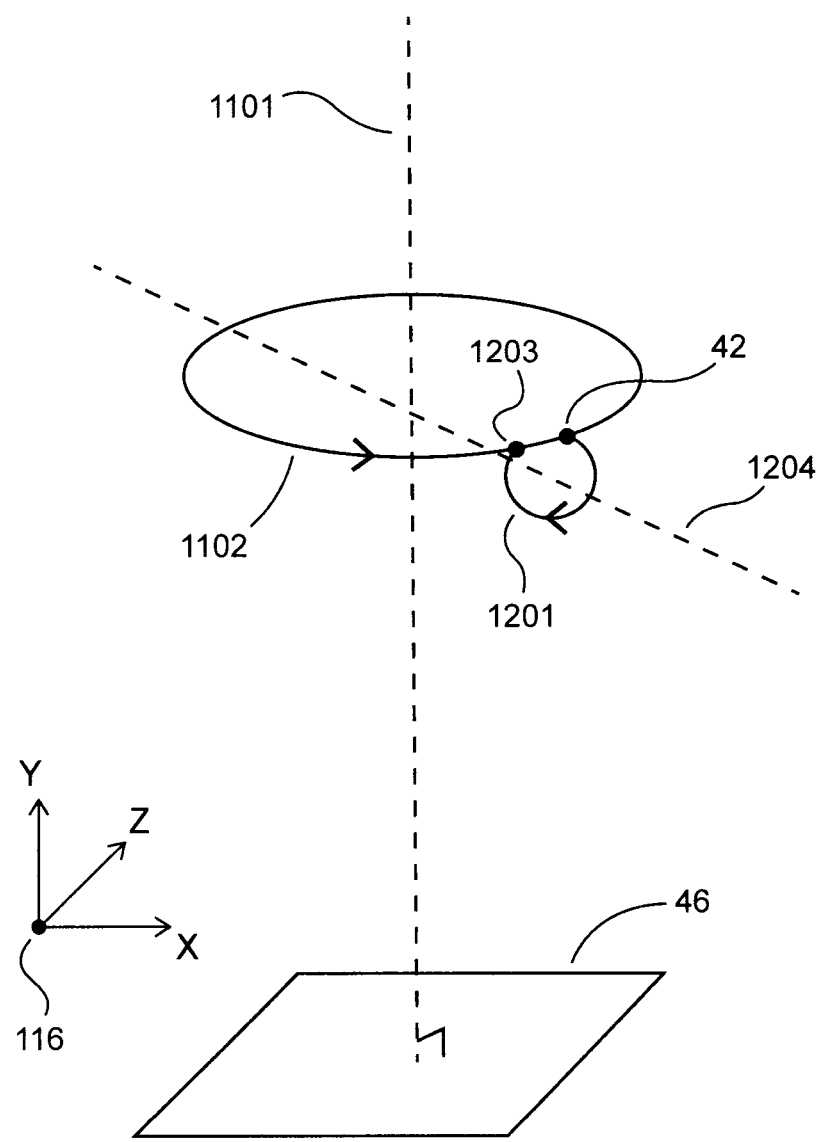
FIG. 12 diagrammatically illustrates a driving oscillatory motion superimposed upon a circular induced oscillation, according to an embodiment of the invention.

Reference is next made to FIG. 12, where in another embodiment the control unit further includes a mode for superimposing a driving oscillatory motion 1201 onto the circular induced oscillatory motion. The driving oscillatory motion in principle works by imposing minute oscillations in a plane parallel to the vertical gyroscopic line 1101, having sufficient speed and amplitude for the work object single contact point 42 to detach in a repetitive manner from the effector tip. During a single cycle, when contact is lost between the effector tip and the work object, the driving oscillatory motion 1201 retracts the effector tip in reference to the circular induced oscillation path 1102 (and as seen projected in the X-Z plane). When contact with the work object is recovered again it will be at a new or updated single contact point 1203. Thus iterative use of these motion cycles at predetermined angular positions effectively rotates or drives the work object around a driving axis of rotation 1204.

Figure 13A:
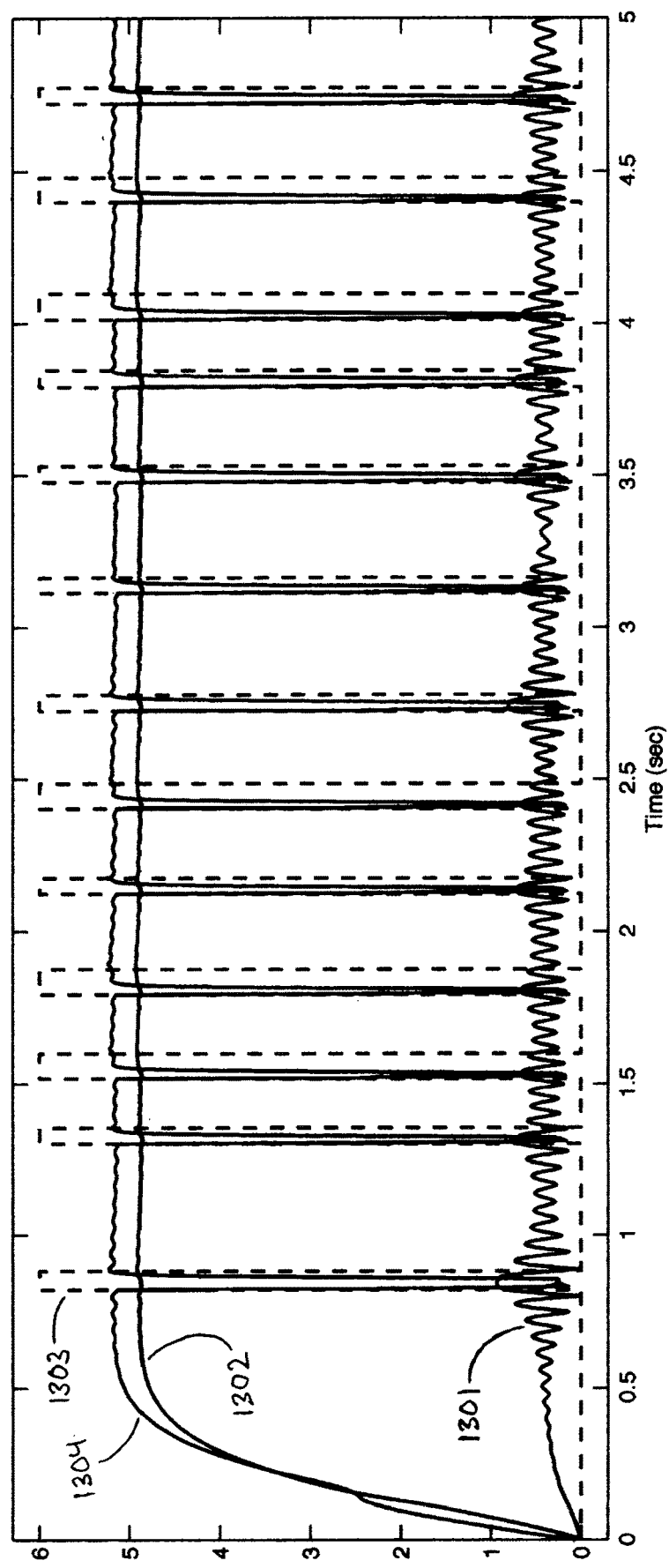
FIGS. 13A and 13B are graphs showing time series of a running control system experimental setup with load balancing control (LBC) turned on and off respectively, according to an embodiment of the invention.
Figure 13B:
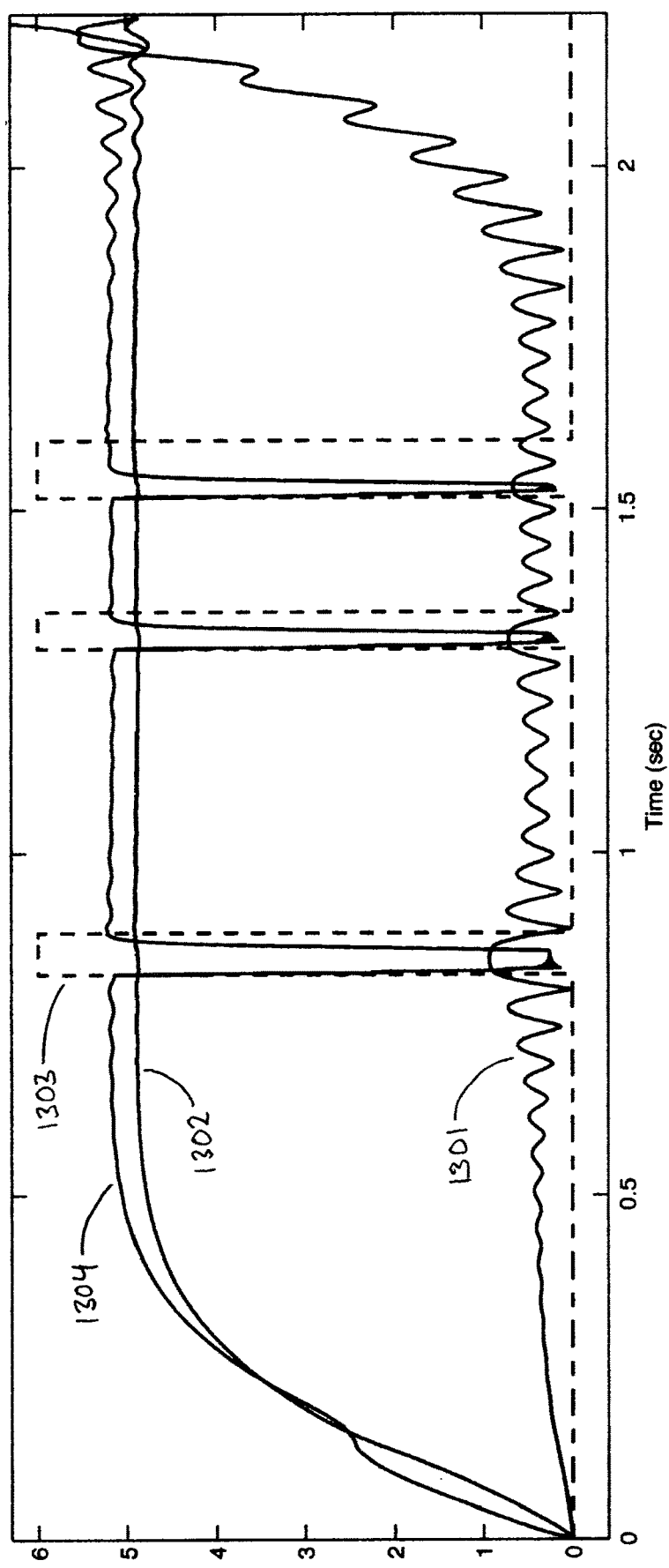

Referring to FIGS. 13A and 13B, an experimental setup timeseries run, implementing the disclosed LBC routine, demonstrates active and inactivated control dynamic responses on a work object respectively. In FIG. 13A induced oscillatory motion according to step 102 (FIG. 10A) is carried out up until t=0.7, where feedback control according to the next step 103 (FIG. 10A) is carried out. Signal 1301 tracks the work object CG-point as the radial distance from the vertical gyroscopic line, as projected in the X-Z plane. Signal 1302 tracks in the same X-Z plane the radial location of the single contact point (effector tip). The time locations and active durations of the IH-routine are displayed by a square signal 1303. The Fr radial control output signal is 1304. Units on the y-axis have been omitted. All signals except 1301 and 1302 are not comparable on a relative scale. From FIG. 13B it is clearly seen that, when inactivating the LBC routine at t=1.7, control of the work object is quickly lost and, further uncontrolled drifting of the CG-point will inevitably lead to the work object completely falling of the effector arm.

Figure 14:
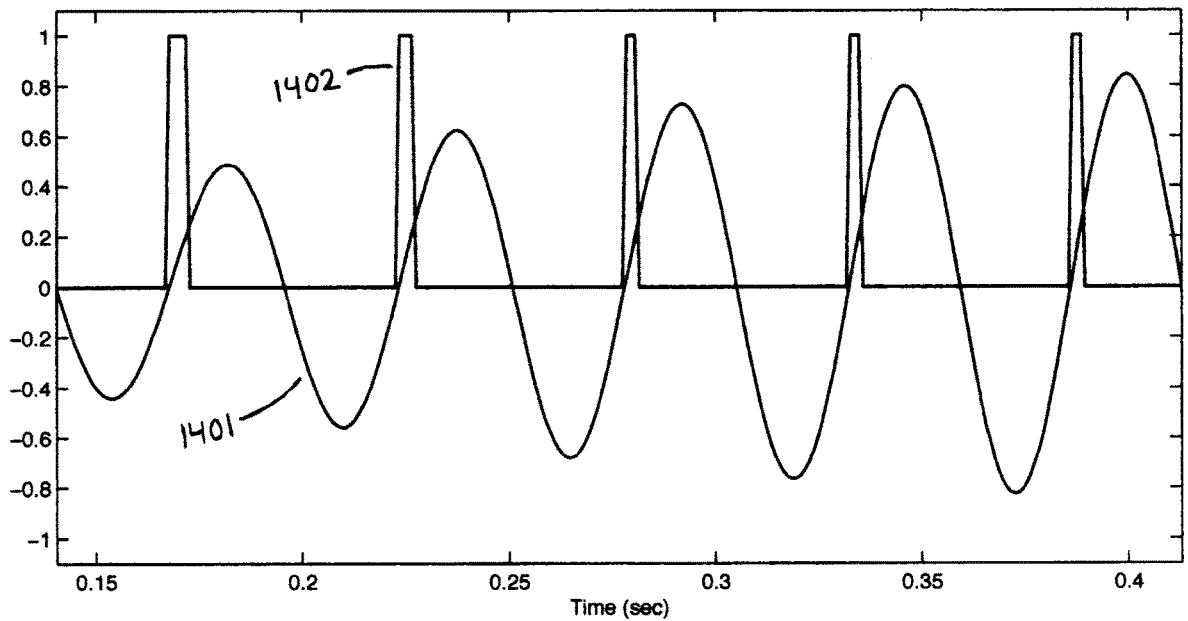
FIG. 14 is a graph showing a triggered control signal of the pulsed illumination source, according to an embodiment of the invention.
Figure 15:
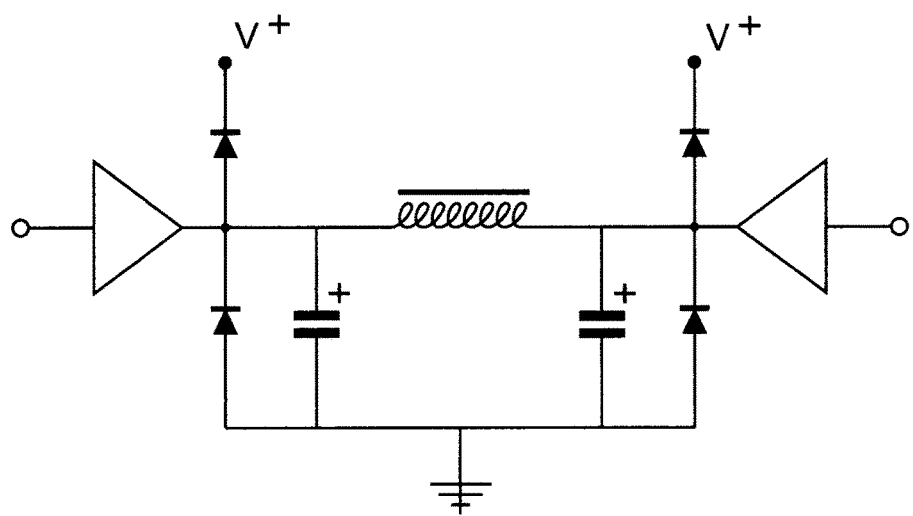
FIG. 15 is a schematic illustrating a PWM driving electrical circuit for an actuator, according to an embodiment of the invention.

Now referring to FIG. 14 pulsed illumination source (PIS) 113 (FIG. 1) is switched on and off at intervals determined by the phase and period of the induced oscillatory motion. For illustrative purposes a typical driving signal 1401 for one of the LC actuators is used to show an example of a triggering signal, and how the PIS triggered signal 1402 responds. As is seen the PIS will be in its on state only at synchronized identical angular positions of the effector arm, and thus the motion of the effector arm (and work object) is visually "resonated" at precisely these positions, suppressing the non-illuminated motion in between and thereby generating the appearance of a vibration-less system. It is understood that the driving signal 1401 can be freely phase shifted if wished for.

Figure 16:
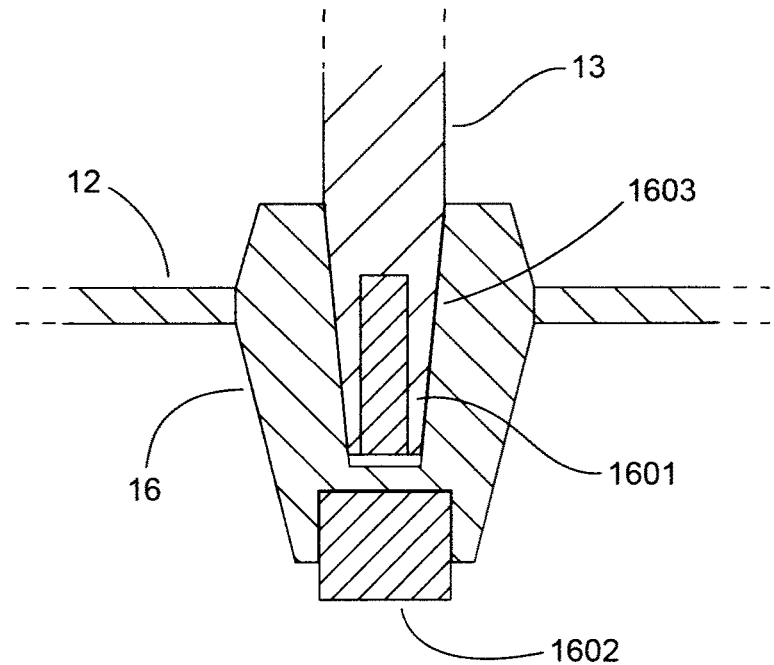
FIG. 16 illustrates a vertical cross section of a magnetic link co joining an effector base plate and an effector arm, according to an embodiment of the invention.

Referring to FIG. 16, the effector arm 13 is connected to the effector base plate 12 through effector base plate connector 16, utilizing the combined effect of magnetic and frictional forces. A magnetic link upper magnet 1601 pulls toward a magnetic link lower magnet 1602 and thus generates frictional adhesion along the slanted connector wall 1603. This makes for a rigid and vibration-resistant link between the effector arm and the base plate.

In another embodiment, the effector tip 14 (FIG. 1) is substituted for other gripping, handling or sensing means, such as a sensing electrode.

It is understood that the LBC routine and driving oscillatory motion detailed for balancing control and work object rotation under gravity forces, may also be utilized for other forces than gravity forces, such as drag viscous forces, elastic or electrostatic forces. In such a scenario, the LBC routine may instead of a load balancing routine be viewed as a force balancing routine, and the ground plane 46 is preferably redefined to be the plane in which the swivel joints 18 reside.

It is understood that the single contact point as defined is only a point in theory, in practice there is always a small contact area at the position of the point, nevertheless the same framework of analysis can be applied if the contact area is sufficiently small.

The parallel kinematic manipulator system and control method having been described herein provides several advantages to conventional manipulator systems and over prior art. Its three coplanar actuators operating parallel to an effector axis allows for high-speed and precision movements at low manufacturing costs. The disclosed disc swivel joints are particularly simple to manufacture, but still allows high-speed operation for a prolonged time with excellent wear characteristics. The described LBC routine and disclosed control methods further allows for work object manipulations using only a minimum amount of physical sensors and the necessary sensors can be located at a distance from the end-effector. Additionally, when the disclosed manipulator system is used in an otherwise mostly silent work environment and when visual inspection of a high-speed automation process is wished for, the noise inhibiting housing and pulsed illumination source provide yet another advantage over prior art systems.

Notice to the fact should be that the preceding description of the present invention has been merely exemplary, and the described embodiments are not to be construed as limiting of the invention. Many alternatives, modifications and variations will be apparent to those skilled in the art.

What is claimed is:

1. A parallel kinematic manipulator system, comprising:
at least three coplanar actuators operating substantially parallel to an effector axis and an effector extending along the effector axis;
wherein the effector having pivot connections respectively with the at least three actuators, each pivot connection having at least two degrees of freedom, whereby the effector is free to translate to any point in a three dimensional defined workspace and,
wherein at least one of the pivot connections includes a disc swivel joint, the disc swivel joint having an upper and lower swivel member sharing a common contact point and at least one of the swivel members having a convex surface facing the other swivel member, whereby the disc swivel joint is allowed to operate analogous to a universal joint serially coupled with two non-parallel prismatic links.

2. The parallel kinematic manipulator system according to claim 1, wherein the at least one disc swivel joint is magnetically coupled.

3. The parallel kinematic manipulator system according to claim 1, wherein the at least one disc swivel joint further comprises two dimensional gear patterns structured into the upper and lower swivel members, whereby higher lateral reaction forces can be absorbed by the effector without slipping of the upper and lower swivel members, thus preventing undue lateral displacement of the effector.

4. The parallel kinematic manipulator system according to claim 1, wherein the at least one disc swivel joint further comprises at least one high friction surface at the interface between the upper and lower swivel members, whereby higher lateral reaction forces can be absorbed by the effector without slipping of the upper and lower swivel members, thus preventing undue lateral displacement of the effector.

5. The parallel kinematic manipulator system according to claim 1, including at least three disc swivel joints placed symmetrically around the effector axis in a plane substantially perpendicular to the effector axis, whereby the effector virtual joint moment forces are shared more optimally by the at least three actuators.

6. The parallel kinematic manipulator system according to claim 5, wherein the at least three disc swivel joints are precisely three.

7. The parallel kinematic manipulator system according to claim 1, further comprising at least one hall effect sensor used for feedback of the state of the effector.

8. The parallel kinematic manipulator system according to claim 1, further comprising a pulsed illumination source, whereby superimposed micro-movements of the effector can be filtered out from visual feedback.

9. The parallel kinematic manipulator system according to claim 8, wherein the pulsed illumination source is symmetrically configured around the effector axis, whereby a higher consistency of motion filtering can be achieved.

10. The parallel kinematic manipulator system according to claim 9, wherein the pulsed illumination source is an annular array of LEDs.

11. A control method for a robotic system including an effector movable in three dimensions such that physical contact at a single contact point with a work object is possible, wherein the single contact point being defined relative to the work object, a control unit, a work object, and at least one sensor producing signals necessary to estimate coordinates of the single contact point in three dimensional space, the control method comprising:
positioning a work object such that a single contact point is made with an effector;
positioning the work object such that its center of gravity (CG) point lies substantially on a vertical gyroscopic line above the single contact point;
inducing an oscillatory motion of the work object, such that the single contact point oscillates in a plane substantially parallel to ground;
processing the signals from the at least one sensor such that estimation of the work object state including a work object general azimuthal angle of tilt can be made for a sufficiently large chosen time window;
detecting if a work object general polar angle is consistently increasing in the work object general azimuthal angle of tilt direction for a sufficiently large chosen time window;
altering the induced oscillatory motion such that the work object general polar angle is decreasing for a sufficiently large time window, whereby the work object tendency to fall due to gravity forces is counteracted.

12. The control method according to claim 11, further including positioning the at least one sensor substantially away from the single contact point, whereby the single contact point is able to reside on a lightweight and thin effector distal end insensitive to signal interference.

13. The control method according to claim 11, wherein the induced oscillatory motion is substantially circular.

14. The control method according to claim 13, wherein processing the signals from the at least one sensor includes checking deviations from a constant control (CC) radius characterizing of the induced oscillatory motion, whereby estimation of the work object general polar angle and the work object general azimuthal angle of tilt is possible.

15. The control method according to claim 14, wherein altering the induced oscillatory motion includes changing the induced oscillatory motion angular speed at an angular position of the effector relating to the estimated value of the work object general azimuthal angle of tilt and subsequently altered back to its original value, such that increase of the work object general polar angle is counteracted.

16. The control method according to claim 15, wherein changing the induced oscillatory motion angular speed comprises:
    decelerating the induced oscillatory motion angular speed to a predetermined set point;
    holding the decelerated speed at the predetermined set point for a time period dependent upon the deviations from the constant control radius;
    accelerating the induced oscillatory motion angular speed back to its initial value.

17. The control method according to claim 11, further comprising superimposing the induced oscillatory motion with a driving oscillatory motion lying in a plane substantially different from the induced oscillatory motion, the driving oscillatory motion causing a momentary loss of physical contact between the effector and the work object, whereby the single contact point is updated to a new location on the work object and rotation of the work object in three dimensions is possible.

18. The control method according to claim 17, wherein the driving oscillatory motion is momentous and initiated recurringly at predetermined phases of the induced oscillatory motion cycle, whereby controlled rotation of the work object around a predetermined rotation axis is possible.

19. The control method according to claim 11, further comprising providing a pulsed illumination source intermittently illuminating the work object, whereby motion not of visual interest is allowed to be visually repressed.

20. The control method according to claim 19, wherein the provided pulsed illumination source pulse frequency is synchronized with the induced oscillatory motion, whereby oscillatory movements due to the induced oscillatory motion are visually repressed.

* * * * *